Figure 1:
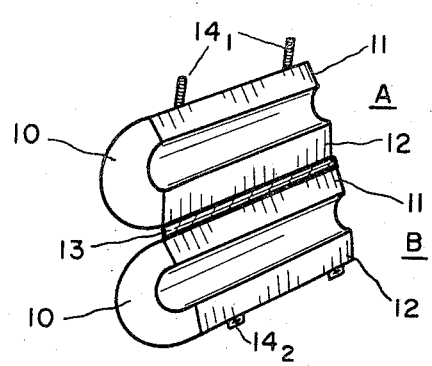

July 25, 1967 C. H. SKINNER ETAL 3,332,093
FLOAT FOR SUBMARINE HOSE SYSTEM
Filed May 25, 1965

INVENTORS
C. H. SKINNER
P. J. KOLARIK
BY John L. Shortley
ATTORNEY

United States Patent Office 3,332,093
Patented July 25, 1967

3,332,093
FLOAT FOR SUBMARINE HOSE SYSTEM
Clayton H. Skinner and Paul J. Kolarik, Buffalo, N.Y., assignors to Hewitt-Robins Incorporated, Stamford, Conn.
Filed May 25, 1965, Ser. No. 458,711
4 Claims. (Cl. 9—8)

This invention relates to a submarine hose system and more particularly to a float construction for such a system.

A submarine hose system is utilized for transporting liquids across a body of water in a submerged state, i.e. from ship to shore and vice versa. The offshore end of the hose is connected to a buoy, caisson or tower, and from this point a hose extension is provided which is picked up and connected to the ship's manifold. It is the hose extension which is provided with floats according to this invention.

The present known practice is to equip this hose extension with a number of ring type or doughnut-shaped floats. The presently known floats comprise a plurality of such members which must be slipped over the hose extension and the coupling flanges. Thus, the known floats are very loosely fitted on the hose extension which allows relative movement between adjacent floats and between the hose and associated floats. This movement produces excessive float wear resulting in a substantial shortening of float life relative to a float which fits snugly on the hose extension.

In addition to the disadvantage noted above, the known plural ring type float requires a fitting, known as a spacer, to keep the float ring from crossing over the coupling flanges of the hose extension. That is, the hose extension may be made up of hose sections connected together by coupling flanges. The individual rings can pass over these flanges resulting in uneven buoyancy for the hose extension. Therefore, with the known system, a spacer is required.

It is possible to provide ring type or cylinder type floats which fit more snugly on the hose extension by providing a removable coupling flange. That is, the coupling flange screws into a threaded fitting made integral with the hose. However, such a coupling arrangement is expensive and it is now customary in hose manufacture to weld the coupling flanges to the hose nipple. Therefore, this approach to the problem is undesirable.

The present invention overcomes the above enumerated difficulties by providing a single elongated cylindrical float for each section of the hose extension. According to the invention, the float is longitudinally split or manufactured in two parts or halves each in the form of a half cylinder. This split float is easily attached to the presently used hose sections of a submarine hose extension by suitable clamping means obviating float wear and therefore materially increasing float life. Because the split float can be clamped onto the hose extension and relative movement eliminated, less buoyancy or fewer floats are required, according to the invention, than with the known float system in which the float could move between coupling flanges and therefore the hose sections of the extensions were covered with floats. The use of more floats than necessary for buoyancy also provided a safety factor in the known system against broken float rings. Thus, the single split float, to be described hereinafter in greater detail, provides further economies over the known system.

Accordingly, it is a primary object of this invention to provide an improved float system for submarine hose extensions over the known system.

A further object of the invention is to provide a float system incorporating a single, split float for a submarine hose extension which is quickly and simply attached to a hose, has a maximum useful life and is economical in use and manufacture.

The foregoing objects and advantages together with additional advantages will become apparent from the following description of the invention given in connection with the accompanying drawing which illustrates a presently preferred embodiment.

FIG. 1 of the drawing is a perspective schematic view of one embodiment of a float according to the invention.

Figure 3:
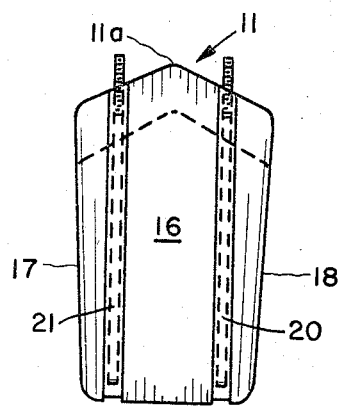
Figure 4:
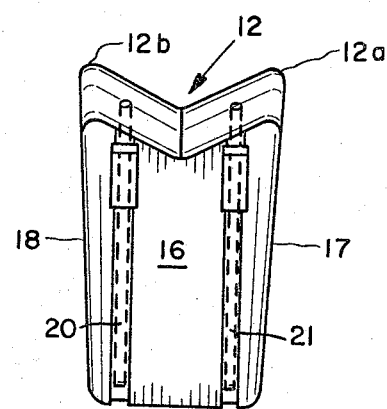
Figure 2:
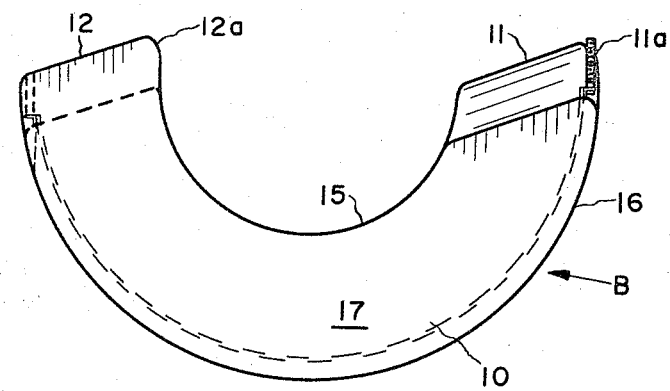

FIG. 2 is an end elevational view of one side of another embodiment of a float according to the invention showing details of construction and FIGS. 3 and 4 are right and left side elevations respectively of FIG. 2.

Referring to the drawing, reference letters A and B generally designate the two semi-rigid float segments of foam plastic or other suitable known material. Each segment of the float is the mirror image of the other segment and consists of a semi-cylindrical body portion 10 having a tongue and groove joint formed along the edges 11 and 12. The sections A and B of the cylindrical float illustrated in FIG. 1 may be hinged at 13 along one edge and the other edge is provided with any suitable clasp or fastening means $14_1$ and $14_2$.

In FIGS. 2, 3 and 4, a ring type float is illustrated to show details of construction which apply equally to the cylindrical float of FIG. 1.

The details of construction shown in FIGS. 2, 3 and 4 relate to the construction of the mating edges generally in the form of a tongue 11 and a groove 12 of each float section A and B. In these figures, only one segment of a ring type float is shown for convenience but both segments are identical though edges 11 and 12 are transposed, i.e., the edge or tongue 11 of the segment shown in FIG. 2 will have opposite it a groove 12 of the float segment not shown. Referring to FIGS. 2 and 3, edge 11 comprises a surface which is generally like a tongue of a tongue and groove joint. The float body defines a central opening adapted to receive the hose which is to be buoyed by the float. The float segments comprising the float body have an inner and an outer peripheral surface which is substantially semi-circular and a pair of longitudinal extending mating surfaces 11, 12. The segments are substantially semi-circles, as illustrated in FIGS. 2 through 4, with the mating surfaces being spaced at each end of the segment. The tongue 11 inclines outwardly from the inner circumference 15 to the outer circumference 16 of the float segment. As seen in FIG. 3, the tongue 11 is substantially V-shaped in cross-section with its side surfaces inclining downwardly from ridge 11a toward both the front face 17 of the float and its other face 18. The groove edge 12 of the float segment has a pair of ridges 12a, 12b in the plane of each face 17 and 18 which extends across the float between surfaces 15 and 16 and also inclines outwardly from the inner circumference 15 toward the outer circumference 16. The surface of groove edge 12 is inclined inwardly toward the center of the ring 10 as seen in FIG. 4 and is formed to matingly receive the tongue surface of a similar segment when the two segments are formed into a float body.

By virtue of the tongue edge 11 and groove edge 12 just described, the float segments A and B are held against relative movement in both the plane of the drawing and the plane normal thereto.

Any suitable means may be utilized to prevent the segments from separating such as the straps 20, 21 shown in FIGS. 2 to 4. These straps may be received in recesses formed in the body 10 or embedded therein. The straps may consist of steel or a suitable synthetic material such as polypropylene rope having appropriate clasping means.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A float comprising a body split longitudinally for defining a pair of float segments each said segment having an inside surface and an outside surface, each said segment having a pair of longitudinally extending mating surfaces; one said mating surface of each segment comprising a generally convex upward portion rising from one of the end faces of said segment and inclined from the said outside surface toward the inside surface of said segment, the other of said pair of mating surfaces being concave to receive the convex surfaces of the other mating segment, and the surfaces of each said mating surface of a segment being in parallel planes; and means for strapping said segments together.

2. A float according to claim 1 wherein said means for strapping said segments together includes a longitudinally extending hinge connecting one juxtaposed edge of said segments.

3. A float comprising a generally cylindrical body having a central opening and split longitudinally for defining a first and second semi-cylindrical segment, each said segment having an inside and an outside circumference and a pair of longitudinally extending mating surfaces, one said mating surface of each segment comprising a generally convex surface rising from an end face of said segment, said one mating surface being inclined from the outside circumference toward the inside circumference of the segment, the other said mating surface of the same segment being concave to receive the convex surface of the other mating segment, and the surfaces of each said mating surface of a segment being in parallel planes.

4. A float comprising a generally cylindrical body split longitudinally for defining a first and second semi-cylindrical segment, each said segment having an inside and an outside circumference and a pair of longitudinally extending mating surfaces, one said mating surface of each segment having a generally V-shape portion defining a crest between the end faces of said segment and inclined from said outside circumference to said inside circumference, the other mating surface of said pair having a generally V-shape portion defining a lateral groove corresponding with said crest and inclined from said inside circumference to said outside circumference in planes parallel with the planes of the first-mentioned mating surface, and means for securing said segments against separation.

References Cited

UNITED STATES PATENTS

| | | | |
|---|---|---|---|
| 2,395,892 | 3/1946 | Lontz | 9—8 |
| 3,126,035 | 3/1964 | Espetvedt | 136—162 |

MILTON BUCHLER, *Primary Examiner.*

T. MAJOR, *Assistant Examiner.*